United States Patent [19]

Raulins

[11] Patent Number: 4,964,305
[45] Date of Patent: Oct. 23, 1990

[54] METHOD AND APPARATUS FOR GAGING PIPE THREADS

[76] Inventor: George M. Raulins, 12408 Veronica, Farmers Branch, Tex. 75234

[21] Appl. No.: 477,619

[22] Filed: Feb. 9, 1990

[51] Int. Cl.⁵ .............................................. G01L 5/24
[52] U.S. Cl. ...................................... 73/761; 29/407; 116/212; 285/93
[58] Field of Search ............................ 73/761, 862.21; 116/212; 285/93, 390; 175/320; 29/407

[56] References Cited

U.S. PATENT DOCUMENTS

4,614,120  9/1986  Fradin et al. ........................ 73/761
4,641,410  2/1987  Plaquin et al. ........................ 29/407

Primary Examiner—Jerry W. Myracle
Attorney, Agent, or Firm—M. H. Gay

[57] ABSTRACT

Method and apparatus for manufacturing thread gages and gaging pipe pins and boxes in which the pins and boxes are marked at circumferentially and axially located points with the thread systems made-up to a selected degree and matching of the marks will indicate make-up of the product thread systmes to the selected degree or the selected degree plus additional make-up and the system automatically compensates for variations from nominal dimensions.

23 Claims, 7 Drawing Sheets

METHOD AND APPARATUS FOR GAGING PIPE THREADS

This invention relates to the gauging of pipe threads and more particularly to methods and apparatus for marking of pipe to very accurately determine the engagement of seal and abutment surfaces and the degree of makeup of threads with simple inexpensive equipment.

Manufacturing connections for Oil Country Tubular Goods and installing them in a well would appear to be a relatively simple matter. This is the case where wells are shallow, straight, low pressure, or non-corrosive. The complications begin when wells are deep, high pressure corrosive, and/or deviated. A search of the literature will reveal literally hundred of technical papers, patents, and devices directed at obtaining a connection, installed in a well, that will provide properties equal to the pipe body regardless of the conditions to which they are exposed. Accomplishing this with an inexpensive, easy to manufacture, readily available connection is the ultimate goal of users and manufacturers.

A significant part of the problem is in making up a connection so that it is known without question that it is precisely assembled in accordance with manufacturers' or API recommended practices. A large portion of the patents and literature is devoted to various solutions to this problem. Many methods have been tried and some are in use today to achieve this, including making up connections in accordance with torque only, turns only, a combination of torque and turns, the use of visual indicators (thread disappearance to marks on the pipe, etc.), the "feel" of the operator, etc.

All of the above methods have been used with a greater or lesser degree of success, but all fall short of the ultimate goal. These makeup methods and marking are illustrated by API Spec. 5CT page 56, and Std. 5B page 5; SPE/.IADC 18697, NEW MAKEUP METHOD for API CONNECTIONS by Day et. al.; Journal of Petroleum Technology, March 1967; and U.S. Pat. Nos. 3,468,563; 3,606,664; 4,127,927; and 4,317,585.

If all connections were make exactly alike, and installed under the exact same conditions using the same thread dope, equipment, etc., most of these methods would be acceptable. However, manufacturing tolerances must be provided and identical running conditions, thread dope, makeup equipment, etc., cannot be maintained.

It is a fairly well accepted precept that any well designed and manufactured connection can be made to perform to near its maximum capability if it can be assembled to certain predetermined specifications and other factors are controlled. For example;

1. In the case of shouldered joints-to a specific torque after shoulders engage or to a specific torque as recommended by the manufacturer-. "How to Ensure Proper Makeup of Premium Shouldered Tubulars"; World Oil, Sept. 1983.

2. In the case of a non-shouldered, tapered connection-to a specified penetration of the male thread into the female after passing the "hand tight" point (point of initial intimate contact)-. API RP5C1, Sixteenth Edition, "Recommended Practice for Care and Use of Casing and Tubing." May 31, 1988.

An object of this invention is to provide an method and apparatus utilizing marking gages for applying marking to the parts at manufacture such that boxes and pins can be make at different locations, but as long as the marking gages are traceable back to the common master reference gages, the method and apparatus will permit precise makeup at assembly.

Another object is to provide methods and apparatus using gages at manufacture of pins and boxes which use the connection thread as a micrometer to obtain accuracies of 0.001" for shoulder or seal contact and 0.05 turn (or less, if desired) for non-shouldered tapered thread penetration.

Another object is to provide methods and apparatus using gages for marking pipe which permit a quick visual check to determine that the pipe was made up correctly or that the makeup has been changed while down hole.

Another object is to provide a method and apparatus using gages for marking pipe for determining very accurately when the pin and box shoulders engage and/or threads are fully made up in a shouldered connection.

Another object is to provide a method and apparatus using gages for marking pipe for determining very accurately when seal surfaces engage and/or when threads are fully made-up in a non-shouldered pipe connection.

Another object is to provide a method and apparatus using gages for marking pipe to determine very accurately when the pin and box threads engage and/or are fully made-up in a tapered non-shouldered connection.

Another object is to provide a method and apparatus using gages for marking pipe during manufacture so that threads can be assembled very precisely, including threads manufactured in different plants.

Another object is to provide a method and apparatus for marking pipe with gages at manufacture which eliminates use of gages and expensive equipment at a well site.

Another object is to provide an method and apparatus as in the preceding objects which may be used with any type of joint including top shouldered, bottom shouldered, center shouldered, "wedge", or non-shouldered tapered connection.

Other objects, features and advantages of this invention will be apparent from the drawings, the specification and the claims.

In the drawings, wherein like reference numerals indicate like parts and wherein embodiments of this invention are shown.

It is a common practice for persons working with threaded connections, in test work, to make up a box and pin and mark each part on the same axial plane before disassembling them. Thereafter, the two parts can be reassembled to exactly the same point; that is, until the two marks are in the same relative position as when they were marked. The marks simply define a radial plane through each part that, when made-up until these planes again coincide, the parts are made-up precisely as before. The marking requires a longitudinal reference, of course, because the radial planes coincide with each revolution.

The same principle is used in the method and apparatus of this invention except that the two planes are predetermined and marked on the product at manufacture. Two master gages (pin and box) patterned after the product thread, are made-up together a preselected amount. This may be the hand tight position, The preselected make-up point may be when the shoulders contact, in the case of a shouldered joint; when the threads reach hand tight make-up (point of intimate engagement) in the case of a tapered connection; or the point of seal contact, in the case of a metal (pin flank) seal followed by shouldering, connections. The preselected position may be determined in any desired manner. After the gages are made-up the desired amount each gage is marked precisely on the same plane and machined in such a way (drilled or milled hole or for example) so that the same plane can be transferred to other gages such as working masters and/or working gages. The same plane can then be transferred through marking to products, so that when made-up to the same preselected point, the marks will align in precisely the same manner as did the master gages. When the original reference mark is made, it does not matter at what point around the circumference it is placed, as long as both box and pin are marked at the same circumferential point while made-up to the preselected reference point with preselected torque, preferably "hand tight". All later marks are traceable back to the same plane whether it be on gages or products. The working gages may be used to mark the hand tight plane or a made-up position such as fully made-up. If the thread system has a minimum and maximum fully made-up position either or both of these positions or a position therebetween may be chosen.

Also, since the marks are made on a particular point or radial plane through the circumferences, each relative rotation of the two parts is divided up into a full 360 degrees like a micrometer. Each degree of rotation is the equivalent of 360 degrees per pitch. For example, in the case of an 8 pitch thread, one degree of revolution results in 0.00035" longitudinal advancement of the thread. Related to the outside of 7" OD pipe, this would be the equivalent of 0.061" or about 1/16" circumferential movement per degree of rotation. It can be seen then that this method of marking and make-up is very precise.

Each pin and box gage will have the conventional threaded section. Extending from these sections in telescoping manner are marking flanges. Preferably the marking flanges extend about the entire circumference but this is not necessary. With the gauges made up the selected degree the gages are marked on the same longitudinal and circumferential planes. This may be accomplished by drilling a hole through the two telescoped flanges. The holes may be transferred to working gages or they may be enlarged to provide guide holes for stencils and then the guide holes used as templates to provide guide holes for stencils in other master gages or working gages. Preferably the drilled holes in the master gages are enlarged to stencil guide holes so that working gage guide holes may be easily checked for accuracy. To provide for manufacture and gaging at different locations a single reference master gage is desired and all master gages are prepared with the reference master. Thereafter working gages can be prepared from the several masters.

The reference holes and stencil guide holes are positioned longitudinally of the made-up gages such that the hole will partially overly the open end of a box when the box and a working box gage are made-up together. Thus a stencil may be used in the hole to mark the box. In like manner the same or another stencil may be used in the guide hole in the pin gage to mark a pin. For instance the stencil may have several circumferentially extending lines. All of these lines would be marked on a pin. As the end of the box extends only part way into the marking hole, only a portion of these lines would appear on the box. The relationship of the lines on the pin and box would indicate the degree of make-up when a joint is made-up to the selected degree.

As gage threads are perfect for all practical purposes their make up with product threads would indicate the departure from nominal tolerance of the product thread and the circumferential lines scribed by the stencil would indicate the departure from nominal.

Preferably the stencil would also scribe a figure decreasing in width in each longitudinal direction such as < > so that the partial scribe > on the box would partially overlay the full scribe< > on the pin and matching of the two scribes would indicate the relation of the threads when made-up to the selected degree. While gages will be made-up to the hand tight position during manufacture of pipe the scribed marks may indicate a full made-up position which can be inspected as pipe is made-up on a rig.

Figure 1:
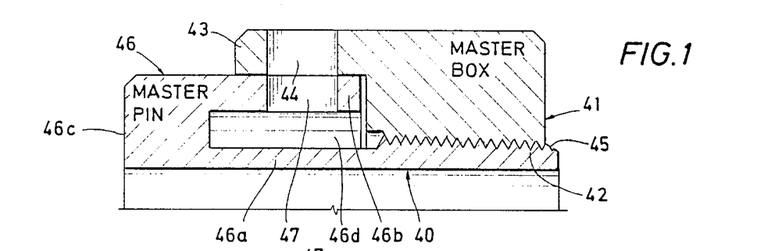
FIG. 1 is a quarter-section view of a made-up master pin and master box gage for tapered threads.

FIG. 1 shows a tapered thread gage system with a tubular master pin gage indicated generally at 40 and a tubular master box gage indicated generally at 41. The master gages would be as described in API Standard 5B modified by the addition of marking sections or flanges.

On the end of the box gage 41 threads 42 are provided. The gage is provided with a circumferentially extending marking section or flange 43 on the other end of the gage. This flange preferably extends for 360 degrees but a lesser arc flange might be used. In the flange a radial marking hole or stencil guide 44 is provided.

The master pin gage 40 has threads 45 at one end. At the other end of the gage a marking section or flange indicated generally at 46 is provided. This flange preferably extends for 360 degrees but a lesser arc flange might be used. The two marking flanges preferably telescope and for this purpose the pin marking section is U-shaped in section and has an inner ring like section 46a extending from the thread section of the gage and an outer ring section 46b. The two ring sections 46a and 46b are joined by a web 46c thus providing an annulus 46d between the two ring sections.

In the ring section 46b of the marking section 46 a radial marking hole or stencil guide 47 is provided.

Before the holes 44 and 47 are cut the master pin and master box gages are made-up to the desired degree such as hand tight. Preferably a hole is drilled through the made-up flanges 43 and 46b. Then the hole is shaped to receive the desired stencil. Thus the holes may be rectangular as will appear below or orientation slot may be used as will appear below.

Preferably a reference master pin and box gage will be fabricated and used to fabricate or check master pin and box gages as will be understood by those skilled in the art. Preferably the reference master box 41 is made-up with successive master pin gages and the radial hole 44 used as a guide to cut radial holes such as 47 in master pins. Also the reference master pin 46 will be made-up with successive master boxes, a hole drilled through the flange of successive master boxes at approximately the location of hole 47 and a tool extended through the drilled hole to engage the wall of hole 47 and guide a mill in cutting radial holes 44 in the master box gages. Other procedures might be used but the above described procedure is preferred.

After master pin and box gages have been fabricated they are used to fabricate working pin and box gages.

Figure 2:
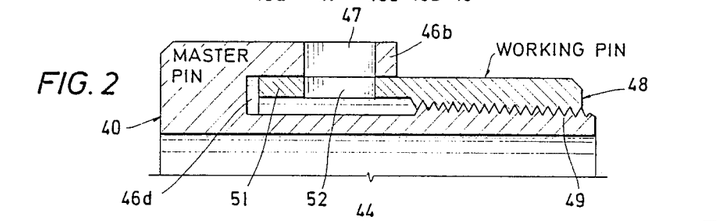
FIG. 2 is a quarter-section view illustrating the master pin gage made-up with a working pin gage.

FIG. 2 illustrates use of a master pin gage to fabricate a working pin gage. A working pin indicated generally at 48 is provided at one end with threads 49. At its other end it is provided with a marking section 51 which extends into annulus 46d and telescopes with section 46b of the master pin 40. The gages are made-up to the same selected degree as the master box and pin shown in FIG. 1. Then the radial marking hole 52 is fabricated in marking flange 51 to register with hole 47.

Figures 3, 4, 5, 5A:
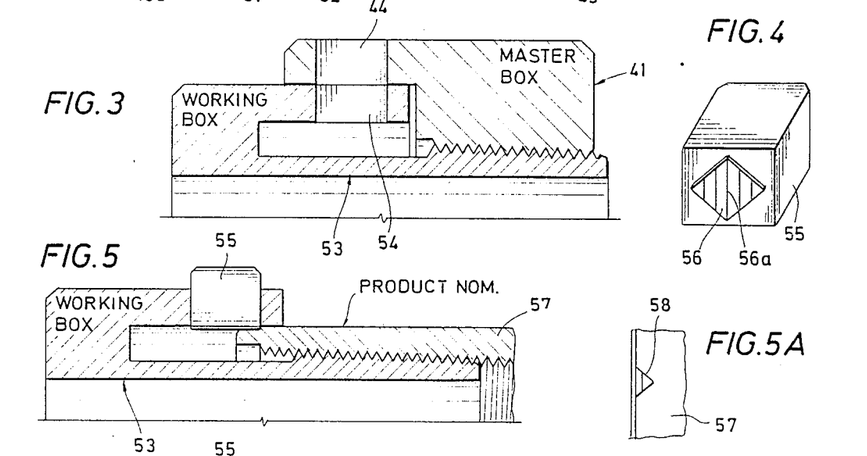
FIG. 3 is a quarter-section view illustrating the master box gage made-up with a working box gage.
FIG. 4 is a perspective view of a marking stencil.
FIG. 5 is a quarter-section view of a working box gage and a nominal tolerance product (box) with the stencil in elevation.
FIG. 5A is a fragment of the product of FIG. 5 in elevation illustrating marking made on the box by the stencil.

FIG. 3 illustrates the master box indicated generally at 41 made up with a working box gage 53. The working box 53 is identical in construction with master pin 40 and will not be further described except to note that when it is made up with master box 41 there is no marking hole in the marking section. After the master box and working box are made up to the same selected degree as the master pin and box the radial marking hole 54 is cut in the marking section using the marking hole 44 in the master box as a guide so that the holes 44 and 54 are in register.

FIG. 4 illustrates a stencil 55 for use with the working box 53 and working pin 48. The stencil is rectangular in shape and may be a ½" by ¾" stencil block. The marking face 56 of the stencil is preferably provided with a plurality of circumferentially extending lines as shown. It is further preferred that the lines be 1 pitch apart and that the marking face be 6 pitches in length. The marking hole overlies a portion of the box when the threads are made up as noted above. It is preferred that the central reference line 56a about which the gage is centered be one pitch outside the end of a box machined to nominal tolerance. This permits the stencil to locate three pitchs lines onto the box (FIG. 5A) when the box gage penetration is maximum (nominal plus one pitch) and to as little as one pitch on the box when the gage penetration is minimum (nominal less one pitch). Preferably the marking face of the stencil is diamond shaped as shown or of any other form in which the stencil line length decrease in either direction from the center line 56a. Preferably the stencil is of the low stress dot type.

Thus as shown in FIG. 5 the working box 53 may be made-up to the selected degree with a product 57 of nominal tolerance and marked with stencil block 55. As only a part of the stencil overlies the box a part of the diamond will be marked on the box as shown at 58 in FIG. 5A. As the product is of nominal tolerance a two pitch depth will appear on the product.

Figure 6:
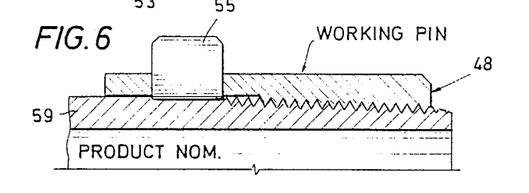
FIG. 6 is a view similar to FIG. 5 of a working pin and nominal tolerance product (pin) and stencil.
Figure 6A:
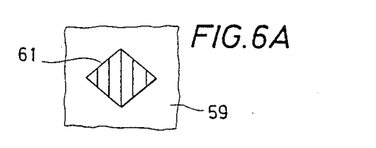
FIG. 6A is a view similar to FIG. 5A illustrating marking made on the pin by the stencil.

As shown in FIG. 6 the working pin 48 is made up to the desired degree with a product 59 of nominal tolerance and marked with stencil 55. The entire diamond appears at 61 on the product as shown in FIG. 6A.

Figure 7:
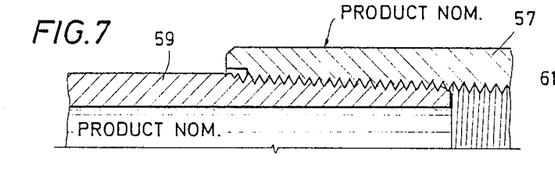
FIG. 7 is a view in quarter-section of the made-up products of FIGS. 5 and 6.
Figure 7A:
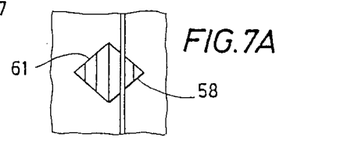
FIG. 7A is a fragment of the products of FIG. 7 in elevation illustrating marking made on the pin and box by the stencil.

The resulting joint is shown in FIG. 7 made-up to the selected degree which positions diamond 61 two pitches in the box so that the partial diamond 58 on the box completes that portion of the diamond 61 in the box.

Figure 8:
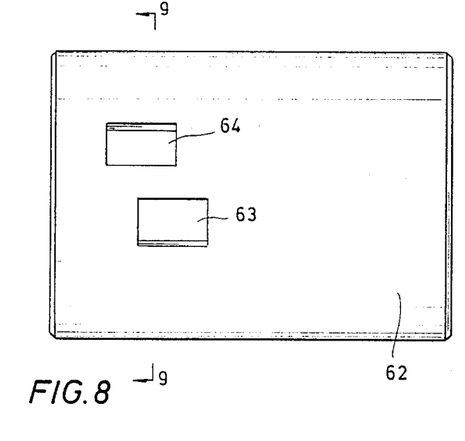
FIG. 8 is a view in elevation of a working pin gage showing two marking holes for hand tight and fully made-up marking.
Figure 9:
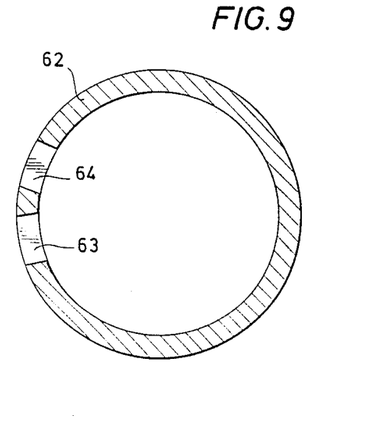
FIG. 9 is a sectional view along the lines 9—9 of FIG. 8.

FIGS. 8 and 9 shows a pin gage 62 having a marking hole 63 for indicating hand tight position of a pin and a second marking hole 64 for indicating a selected number of degrees or turns beyond hand tight, for instance, optimum fully made-up position as recommended by API specifications.

Figure 10:
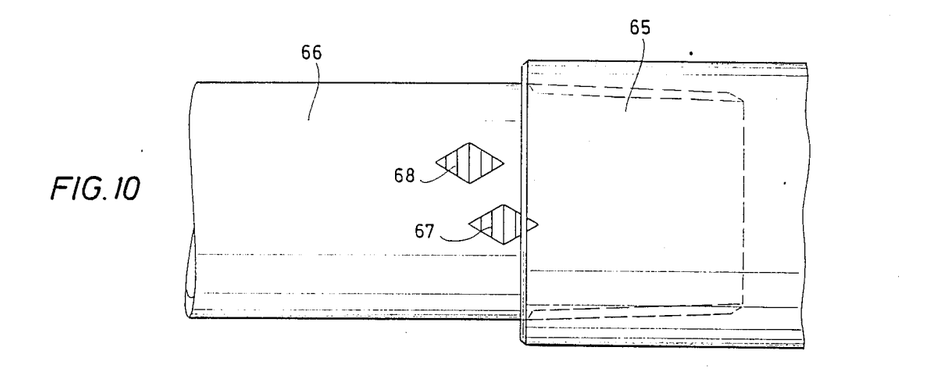
FIG. 10 is a view in elevation of a pin and box stenciled with the pin gage of FIG. 8 and the box gage of FIG. 5 and made-up hand tight.
Figure 11:
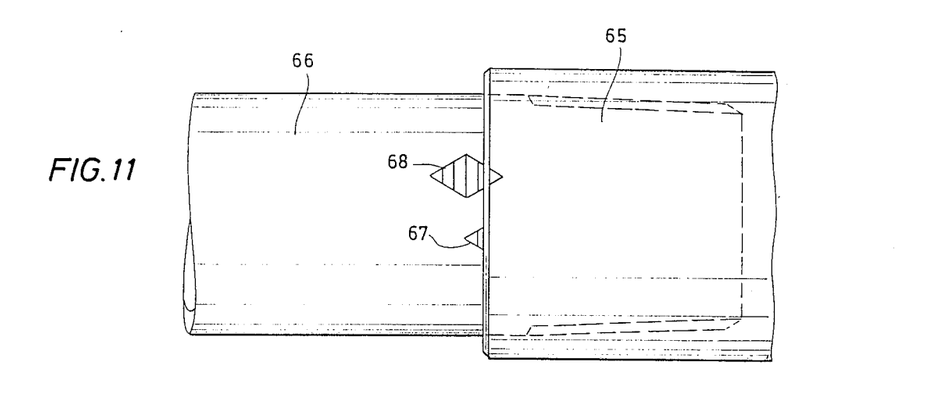
FIG. 11 is a view similar to FIG. 10 with the pin and box fully made-up.

FIG. 10 shows a box 65 made-up hand tight on a pin 66 having diamonds 67 stenciled using hole 63 as a guide and diamond 68 stenciled using hole 64 as a guide. FIG. 11 shows the same joint made-up to the selected number of degrees beyond hand tight such as optimum full make-up. These figures illustrate that any degree of make-up may be indicated as desired by the diamonds.

FIGS. 12 through 20A illustrate how using the gages of this invention compensates for difference in tolerance and the scribed diamond will be completed when the threads are made up to the selected amount in all cases. In these figures nominal tolerance indicates that the threads gage to center of tolerance; maximum tolerance indicates that the threads gage to the largest diameter within tolerance on the box thread and smallest on the pin; and minimum tolerance indicates that the threads gage to the smallest diameter within tolerance on the box and largest on the pin. Diamond marks on these Figures indicate hand tight conditions.

Figures 12, 12A, 13, 13A, 14, 14A:
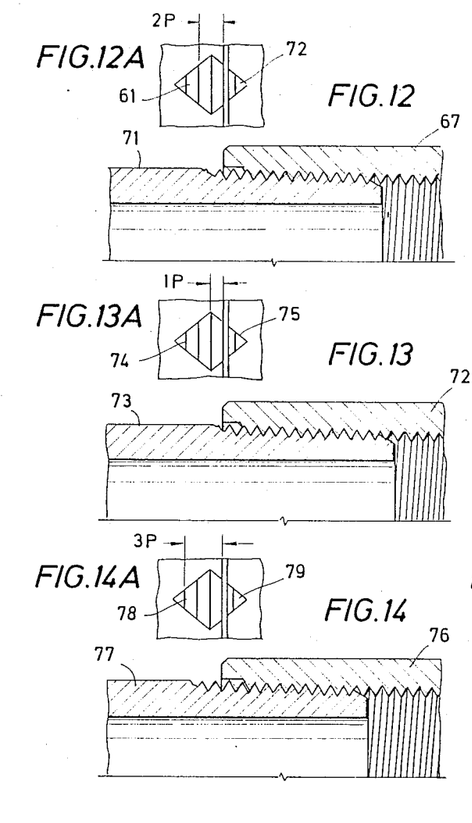
FIG. 12 is a view in quarter-section of a pin and box of nominal tolerance.
FIG. 12A is a fragmentary view of the pin and box of FIG. 12 illustrating marking thereon using the gages of FIGS. 5 and 6.
FIGS. 13 and 13A are views similar to FIGS. 12 and 12A respectively illustrating a box of nominal tolerance and a pin of minimum tolerance.
FIGS. 14 and 14A are views similar to FIGS. 12 and 12A respectively illustrating a box of nominal tolerance and a pin of maximum tolerance.

FIGS. 12 and 12A illustrate a nominal tolerance box 69 and pin 71 in hand tight relationship. As the center of the mark 72 on the pin is 1 pitch from the end of the box the pin thread vanishing point is 2 pitches away from the face of the box. The mark 72 on the box completes the mark 61 which has two pitch marks inside the box.

FIGS. 13 and 13A illustrate an nominal tolerance box 72 and a minimum tolerance pin 73. Again two pitch lines of mark 74 is within the box but the pin thread vanishing point is at the center line of mark 74 and is only 1 pitch away from the end of the box and mark 75.

FIG. 14 and 14A illustrate a nominal tolerance box 76 and a maximum tolerance pin. The mark 78 again is completed by mark 79 with two pitch marks of mark 78 within the box and the pin thread vanishing point 3 pitches away.

Figures 15, 15A, 16, 16A, 17, 17A, 18, 18A, 19, 19A, 20, 20A:
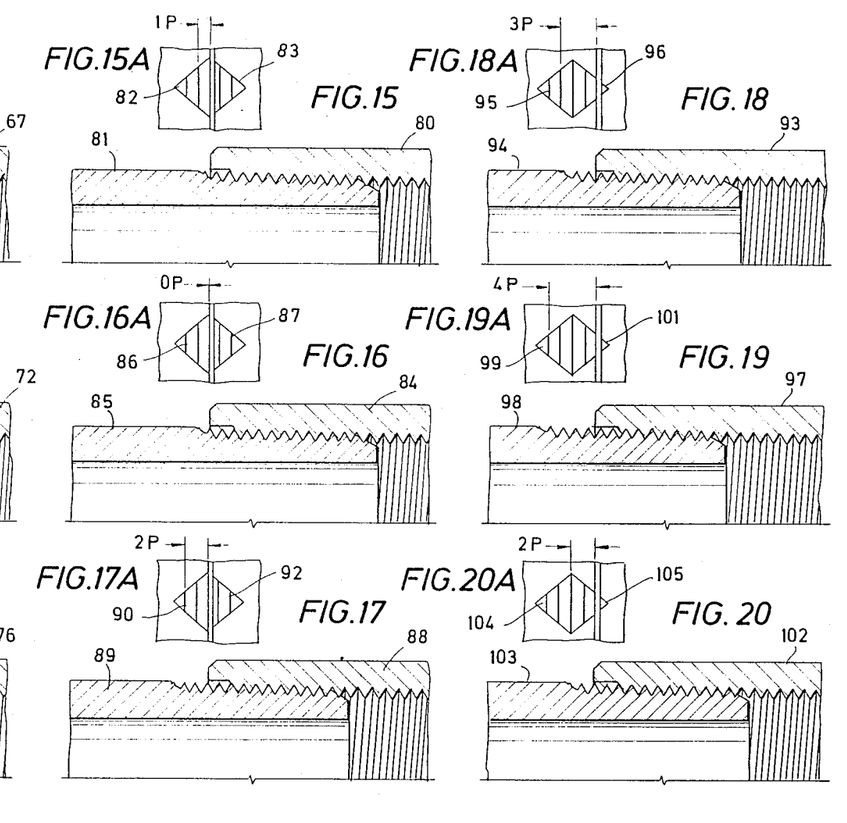
FIGS. 15 and 15A are views similar to FIGS. 12 and 12A respectively illustrating a box of maximum tolerance and a pin of nominal tolerance.
FIGS. 16 and 16A are views similar to FIGS. 12 and 12A respectively illustrating a box of maximum tolerance and a pin of minimum tolerance.
FIGS. 17 and 17A are views similar to FIGS. 12 and 12A respectively illustrating a box and pin of maximum tolerance.
FIGS. 18 and 18A are views similar to FIGS. 12 and 12A respectively illustrating a box of minimum tolerance and a pin of nominal tolerance.
FIGS. 19 and 19A are views similar to FIGS. 12 and 12A respectively illustrating a box of minimum tolerance and a pin of maximum tolerance.
FIGS. 20 and 20A are views similar to FIGS. 12 and 12A respectively illustrating a pin and box of minimum tolerance.

FIGS. 15 and 15A illustrate a maximum box 80 and a nominal pin 81. Three pitch lines of mark 82 underlie mark 83 and the pin thread vanishing point is 1 pitch from the box.

FIGS. 16 and 16A illustrate a maximum tolerance box 84 and a minimum tolerance pin 85. Three pitch marks of mark 86 underlie mark 87 and the pin thread vanishing point is at the end of the box.

FIGS. 17 and 17A illustrate a maximum tolerance box 88 and pin 89. Three pitch marks of mark 91 underlie mark 92 and the pin thread vanishing point is two pitches away from the box.

FIGS. 18 and 18A illustrate a minimum tolerance box 93 and a nominal tolerance pin 94. Two pitch marks of mark 95 underlie mark 96 and the pin thread vanishing point is three pitches away from the box.

FIGS. 19 and 19A illustrate a minimum tolerance box 97 and a maximum tolerance pin 98. Two pitch marks of mark 99 underlie mark 101 and the pin vanishing point is 4 pitches away from the box.

FIGS. 20 and 20A illustrate a minimum tolerance box 102 and pin 103. Two pitch marks of mark 104 underlie mark 105 and the thread vanishing point is two pitches away from the box.

From a review of FIGS. 12 through 20A it is apparent that at any deviation of thread tolerance from nominal, practice of this invention results in marks on the pin and box which will complete a selected figure such as a diamond when the joint is made-up to the selected degree. As all of the working gages may be traced back to a reference master gage, the pins and boxes may be fabricated at different factories. As gaging at a factory is under clean conditions and the pipe is truly round the gages will indicate true thread conditions and any deviation from nominal as shown in these figures will be caused by an outside influence and if the deviation is sufficient the joint may be discarded. It will be noted that the marks always indicate a total number of pitches equal to that scribed on the pin. If more or less pitches are visible deviation is present. Use of a diamond or like figure makes this apparent because a deviation results in misalignment of the diamond sides.

In some cases it is desired that a few threads at the end of the pin be engaged at hand tight position to insure that a seal will occur at these threads when the joint is fully made-up. In such a case the gages will be provided with threads for engaging only these threads on product pins and the complementary threads on boxes. Of course, any number or section of threads from the full system as shown down to any smaller number of threads may be gaged.

FIGS. 21 through 27 illustrate use of this invention with a bottom shouldered joint. The master box gage 106 is identical to master box gage 41 of FIG. 1 except it has a bottom shoulder 107 and the marking hole 111 is circular with an aligning groove 111a. The master pin gage 108 is identical to the master pin gage 40 of FIG. 1. except the end face bottoms on shoulder 107 when the joint is made-up and the marking hole 112 is circular with a aligning groove 112a. With the joint made-up to the selected (hand tight) degree the radial marking holes 111 and 112 are cut as in the case of the FIG. 1 joint. Again a reference master and working master gages would be provided as in the case of non-shouldered threads.

Figure 22:
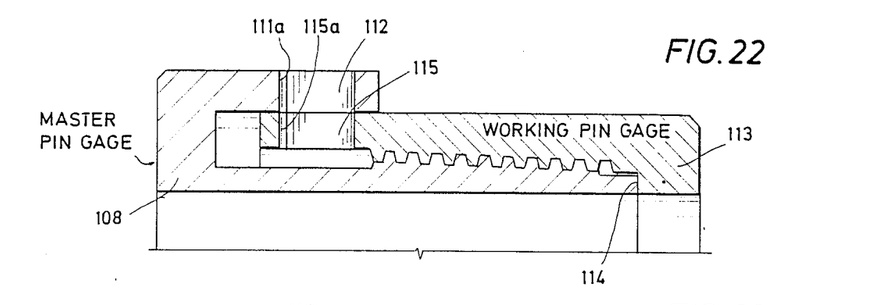
FIG. 22 is a view in quarter-section of a master pin gage and working pin gage for bottom shouldered connections.

As shown in FIG. 22 the master pin gage 108 is made-up with a working pin gage 113 which only differs from the working pin gage 48 of FIG. 2 in having a shoulder 114 for engagement by the shoulder 109 on master pin gage 108 and the marking hole 115 is circular with an aligning groove 115a. Hole 112 in the master pin gage is utilized in cutting the marking hole 115 in the working pin gage.

Figure 23:
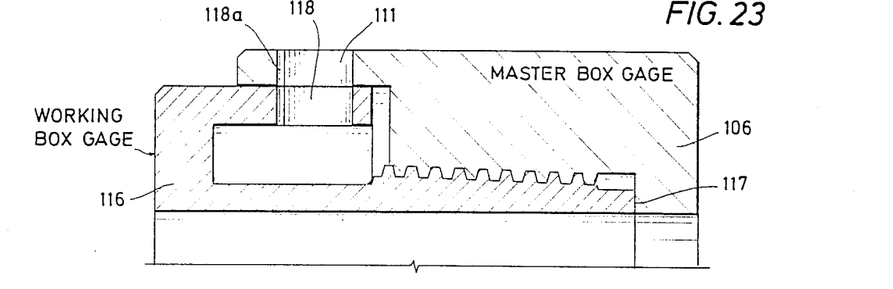
FIG. 23. is a view in quarter-section of a working box gage and a master box gage for bottom shouldered connections.

FIG. 23 illustrates use of the master box gage 106 in fabricating the working box gage 116. The working box gage is the same as the working box gage 53 of FIG. 3 except for the provision of shoulder 117 and the circular marking hole 118 with the aligning groove 118a. After the two gages are made-up the hole 111 is used to cut registering hole 118 in the gage 116.

Figure 24:
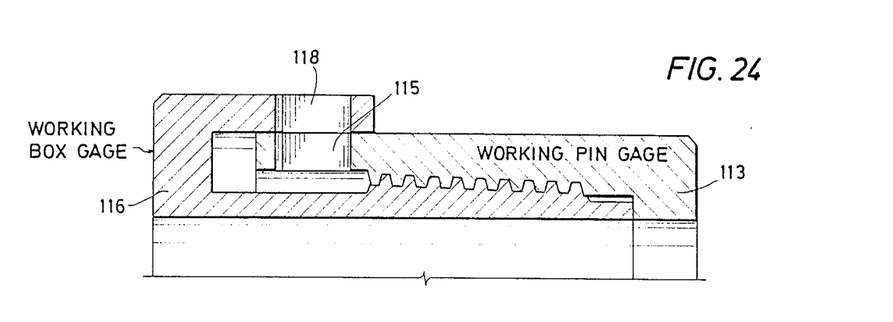
FIG. 24 is a view in quarter-section of a working box and pin gage for bottom shouldered connections.

FIG. 24 illustrates the working pin gage 113 and working box gage 116 made-up and the marking holes in register.

Figure 25:
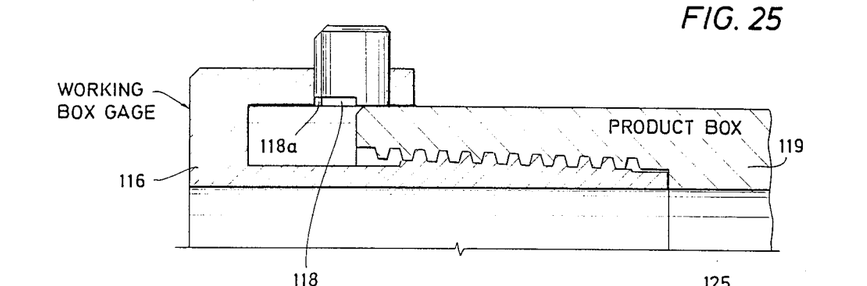
FIG. 25 is a view in quarter-section of a working box gage and a product box gage for bottom shouldered connections with a stencil in elevation.

FIG. 25 illustrates use of the working box gage 116 in marking a product box 119. After the gage and product are made-up the cylindrical stencil indicated generally at 121 is oriented in marking hole 118 by a rib 121a on the stencil in groove 118a in the marking hole. The stencil has a downwardly projecting half-moon section 122 with marking lines raised thereon. Preferably the marking lines are a half-circle line 123 closed by a diametral line 124 and a line 125 quartering the half-circle.

Figures 25A, 26:
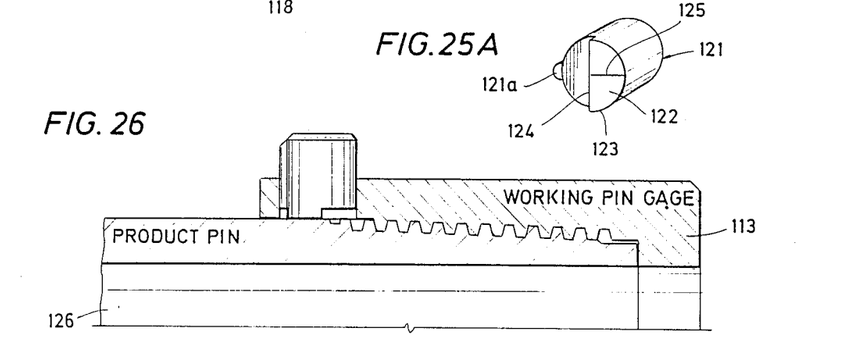
FIG. 25A is a perspective view of the stencil of FIG. 25.
FIG. 26 is a view in quarter-section of a product pin and a working pin gage for bottom shouldered connections with a stencil shown in elevation.
Figure 26A:
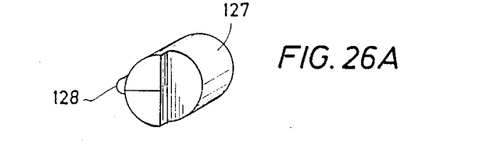
FIG. 26A is a perspective view of the stencil of FIG. 26.

FIG. 26 illustrates use of the working pin gage 113 to mark product pin 126. As shown in FIG. 26A the stencil 127 is identical to stencil 121 except that the aligning groove is 180 degrees away from the aligning groove 121a. As shown in FIG. 26 this reverses the marking lines.

Figure 27:
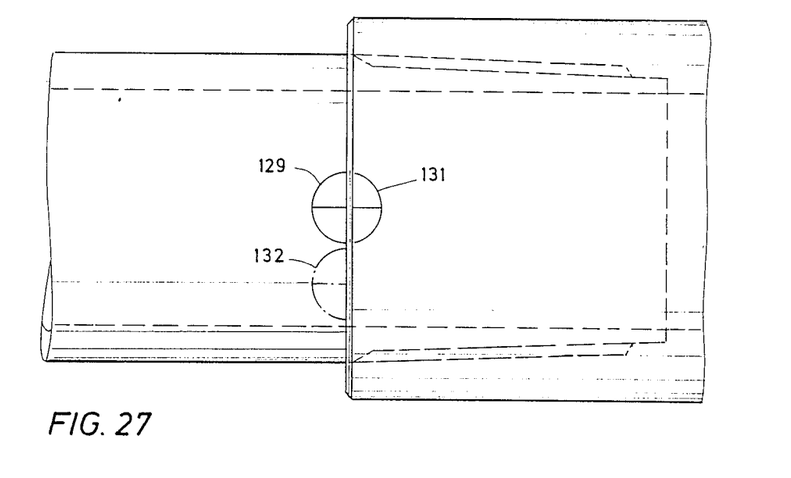
FIG. 27 is an elevation view of a pin and box in fully made-up position with the hand tight position shown in dashed lines on the pin and showing the thread system in its made-up position in dashed lines.

FIG. 27 shows the product pin 126 and product box 119 fully made-up with the half-moon circles 129 and 130 made by the two stencils complete and the quartering lines in alignment. The hand tight position is indicated in a dashed line half-moon 132.

In bottom shouldered joints the gages only engage the bottom shoulder of the product and the thread load flanges so that thread and seal surface make-up are avoided in determining the hand tight position.

The shoulder joint is particularly vulnerable to trash between the shoulders. Even a standoff of a few thousands can easily cause a failure of the connection. A standoff of 0.005" is undetectable with prior art make-up methods. Therefore, it could be critical in many cases to have a visual indication that the shoulders have properly engaged. This system can visually detect insufficent make-up of 0.001".

In practice a set of gages marked for hand tight make-up would be used to mark a number of test products. Then they would be made-up with the manufacturer's recommended minimum and maximum make-up torques to determine empirically how much past "hand tight" full make-up actually is. A new pin marking gauge would then be made to mark an minimum make up point and/or a minimum and maximum make-up. When made up to the minimum torque, the markings indicates that full make up has been reached. Make-up past the "maximum" mark would indicate that either overtorquing, yielding of the box threads in tension, or a yielding and possible deformation of the shoulders had occurred. A problem such as cross threading, trash on shoulder, too much interference, etc., when made-up to recommended torque, would be reflected by the markings not reaching the minimum make-up position.

It should be kept in mind that the connection in the field would be normally made-up to the recommended torque and then the markings checked visually to insure proper make-up. This would normally be true for all forms of thread systems.

In some cases where tubing is used as a work string, there is an ever present danger of attempting to transmit too much torque through the string. Should this be suspected, a check of the marking on each connection when the string is pulled and before being broken out, would give an immediate visual indication that it had been over-torqued and the joints that should not be reused can quickly be determined and laid aside.

This invention is also adaptable to use with a two-step connection to ensure adequate seal engagement. Many manufacturers apply this thread to tubing and accessories and each claim their's to be interchangeable with at least some other manufacturer's products. Since each manufacturer's drawings, dimensions, gaging, and tolerances are confidential, there is no positive assurance that they will always mate with each other. There is little problem with them screwing together and shouldering, because thread pitch, shoulder angle, etc., are either published or easily determined. However, it is much more difficult to determine if the seals have proper engagement with either the same or other manufacturer's products in every case. Pressure testing alone is misleading because the shoulders alone may seal until subjected to high tensile loads or thread dope will seal for short periods of time at surface temperatures.

This invention resolves this problem as well. FIGS. 28 through 33 show this invention applied to two-step joint.

Figure 21:
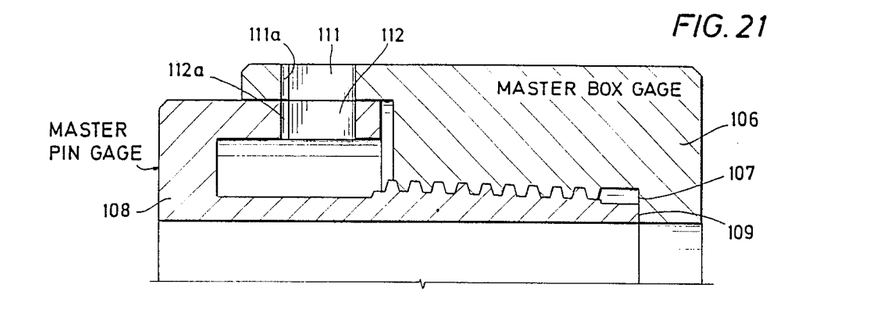
FIG. 21 is a view in quarter-section of a master box and pin gage for bottom shouldered connections.
Figure 28:
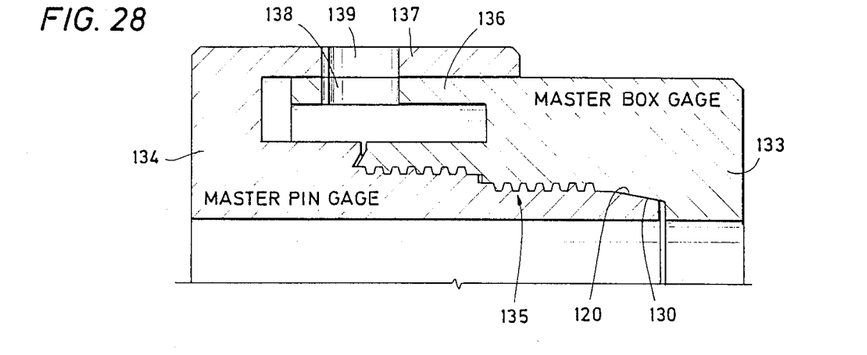
FIG. 28 is a view in quarter-section of a two step master box and pin gage.

FIG. 28 shows master box gage 133 and master pin gage 134 which are identical to master box gage 106 and master pin gage 108 of FIG. 21 except for the conventional two-step thread system indicated generally at 134 and positioning of the marking flange 136 of the box gage radially inwardly of the marking flange 137 of the pin gage. The marking holes 138 and 139 are in register at hand tight position when the seal surfaces 120 an 130 are in contact.

Figure 29:
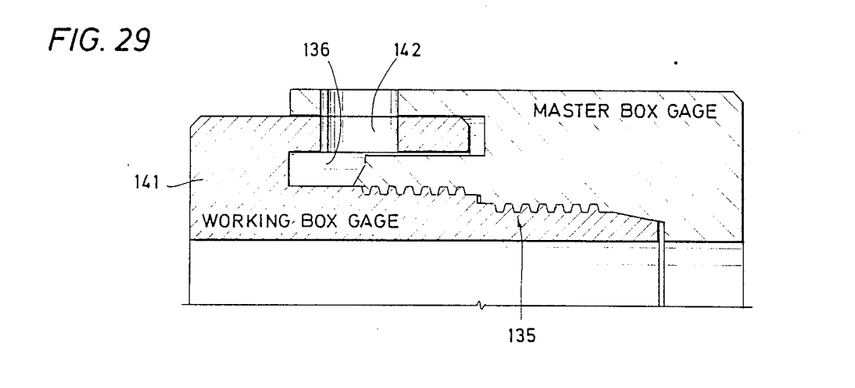
FIG. 29 is a view in quarter-section of a two step master and working box gage.

FIG. 29 shows the master box gage 133 used to fabricate working box gage 141. The working box gage is substantially identical to the working box gage 116 shown in FIG. 23 except for the conventional two-step thread 135 and the annulus 136 having a lesser radial dimension. Forming the marking hole 142 follows the above described procedure.

Figure 30:
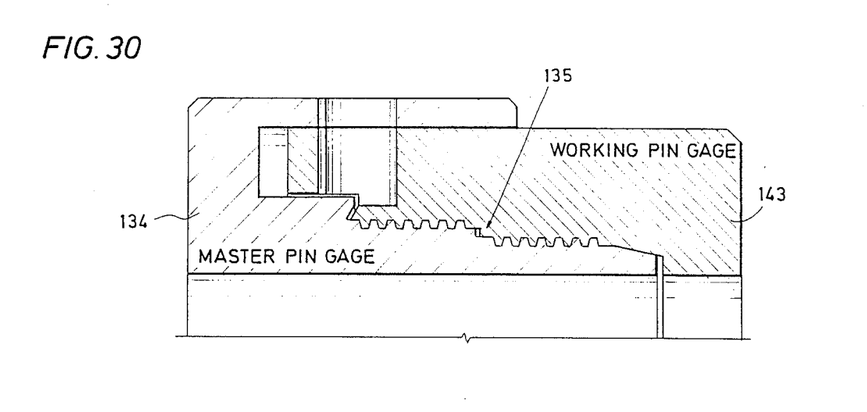
FIG. 30 is a view in quarter-section of a two step master and working pin gage.

FIG. 30 shows the master pin gage made-up with the working pin gage 143. This gage is substantially identical to gage 113 of FIG. 24 except for the thread system 135 and the gage having a larger radial dimension.

Figure 31:
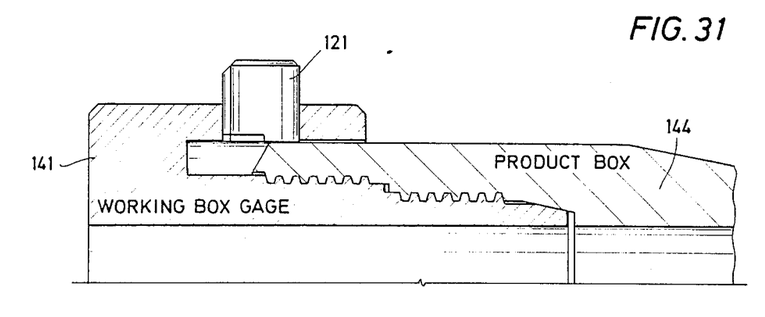
FIG. 31 is a view in quarter-section of a working box gage and a product box with a stencil in elevation.

FIG. 31 shows the working box gage 141 made-up with a product box 144 in position to be marked by stencil 121 (FIG. 25A) modified to stencil an arrow instead of a half-moon.

Figure 32:
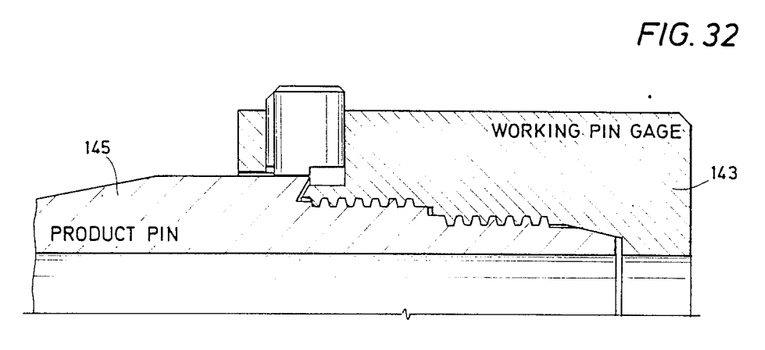
FIG. 32 is a view in quarter-section of a working pin gage and a product pin with a stencil in elevation.

FIG. 32 shows the working pin gage 143 made-up with a product pin 145 in position to be marked by stencil 127 (FIG. 26A) modified to stencil arrow instead of a half-moon.

Figure 33:
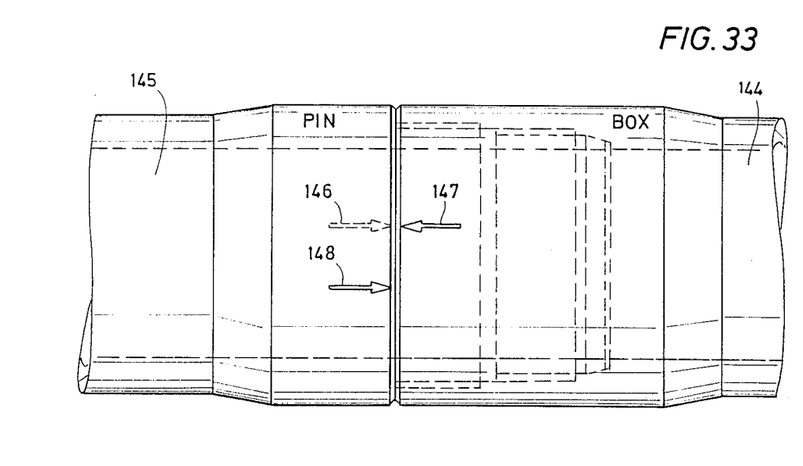
FIG. 33 is a view in elevation of a two step pin and box fully made-up with arrows showing the hand tight seal engagement position and an arrow in dashed lines on the pin showing the fully made-up position and the threads and seal surfaces shown in dashed lines.

FIG. 33 shows the product box 144 and product pin 145 after marking and made-up to full make-up position as indicated by the dashed arrow 146 on the pin in register with the arrow 147. The location of arrow 146 in relation to arrow 148 is determined mathmatically based on the minium amount of seal engagement desired. For instance if the desired radial seal engagement can be attained by 0.010" lingitudinal penetration of the pin into the box and the thread lead is 0.125" (8TPI) then 0.010/0.125×360 would indicate that arrow 146 should be 28.8 degrees past arrow 148. As the threads are made up, the seals engage as the arrows 148 and 147 are in allignment. As arrow 146 alligns with arrow 147, minimum seal engagement has been attained. Further make-up past this point indicates additional seal engagement past minimum.

The invention is also applicable to other thread systems such as the Hydril Dovetail Thread form shown in U.S. Pat. No. Re. 30,647.

It will be understood from the above that all marking holes which are a selected make-up distance beyond hand tight position are preferrably positioned at calculated distances beyond the hand tight position. For instance hole 64 is a measured distance beyond hand tight hole 63 such as 3.1 turns which may be measured and cut with available equipment. In practice the master gages would require only the hand tight marking hole. The working gauges would preferrably have the made-up marking hole 64 for use in marking pipe and hand tight hole 63 for checking calibration with a master.

The foregoing disclosure and description of the invention are illustrative and explanatory thereof and various changes in the size, shape and materials, as well as in the details of the illustrated construction, and various changes in the process, may be made within the scope of the appended claims without departing from the spirit of the invention.

What is claimed is:

1. A thread gaging and marking system comprising:
   a first tubular gage having first threads at one end and a first marking section at the other end,
   and a first radial marking hole in said first marking section;
   a second tubular gage having second threads at one end for making up with said first threads and a second marking section at the other end,
   and a second radial marking hole in said second marking section;
   said first and second marking sections telescoping and said first and second marking holes in register when said first and second threads are made up a selected amount,
   said first radial marking hole positioned to partially overly the end of a box when a box is make up with said one tubular gage said selected amount.

2. The gaging and marking system of claim 1 wherein said selected amount of makeup is the hand tight makeup position.

3. The gaging and marking system of claim 1 wherein said selected amount of makeup is hand tight and a second marking hole is provided in the pin gage at hand tight plus a selected number of degrees of make-up.

4. The gaging and marking system of claim 1, 2 or 3 wherein a stencil having equally spaced line making means extending circumferentially of said first and second gages is reciprocal in said marking holes.

5. The gaging and marking system of claim 1, 2 or 3 wherein a stencil having equally spaced line making means extending circumferentially of said first and second gages is reciprocal in said marking holes, and
   said line making means is within a figure marking means decreasing in width toward opposed ends of said made-up first and second gages.

6. The gaging and marking system of claim 1, 2 or 3 wherein a stencil having equally spaced line making means extending circumferentially of said first and second gages is reciprocal in said first and second marking holes,
   said line making means is within a figure marking means decreasing in width toward opposed ends of said made-up first and second gages, and
   markings on a pin and box workpiece utilizing said gages and stencil indicates the variance of threads in each workpiece from nominal and the combined marking on two workpieces when made-up to the selected amount equals the complete marking of the stencil.

7. The gaging and marking system of claim 1, 2 or 3 wherein a stencil reciprocal in said marking holes and and marking products and having one or more lines parallel with the axes of the gages indicates the relative correct engagement of the work pieces or the amount over or under engagement of the work pieces.

8. The gaging and markinge system of claim 1, 2 or 3 wherein said second gage has an internal shoulder on the side of said first threads remote from said first marking section engagable by said first gage when said first and second gages are made-up said selected amount.

9. The gaging and marking system of claim 1 wherein said selected amoung is hand tight plus a selected number of degrees.

10. The gaging and marking system of claim 1 wherein the selected amount of make-up is hand tight engagement of two mating shoulders of the assembled gages.

11. The gaging and marking system of claim 1 wherein the selected amount of make-up is hand tight engagement of two mating tapered surfaces of the assembled gages.

12. The gaging and marking system of claim 1 wherein said selected amount is hand tight intimate engagement of the mating thread profiles of the assembled gages.

13. The gaging and marking system of claim 1 wherein said first marking section is U-shaped in cross-section,
   the inner leg of said U-shape extending from said one end and the outer leg having said first marking hole therein, and
   said second marking section overlies said outer leg.

14. The gaging and marking system of claim 1 wherein said first marking section is U-shaped in cross-section,
   the inner leg of said U-shape extending from said one end and the outer leg having said first marking hole therein,
   and said second marking section extends between said inner and outer legs when said threads are made-up.

15. The gaging and marking system of claim 1 wherein said second marking section has two radial marking holes, one in register with said first marking hole when said threads are made-up a selected amount and the second in register with said first marking hole when said threads are made-up said selected amount plus a selected number of degrees.

16. The method of fabricating working pipe gages comprising,
   fabricating a master pin gage with a pin marking flange,
   fabricating a master box gage with a box marking flange,
   making up said box and pin gages to a selected degree with said pin marking and box marking flanges in overlapping relationship,
   forming registering radially extending marking holes in said marking flanges,
   making up said master pin gage to said selected degree with a working pin gage having a marking flange telescoping with said master pin gage marking flange, form a marking hole in said working pin gage marking flange in register with said master pin marking hole, making up said master box gage to said selected degree with a working box gage having a marking flange telescoping with said master box gage marking flange, and forming a marking hole in said working box gage marking flange in register with said master box marking hole.

17. The method of claim 16 wherein a second marking hole is formed in said working pin gage a selected number of degrees of make-up beyond hand tight make-up from said pin gage marking hole.

18. The method of gaging and marking pipe comprising, fabricating a master pin gage with a pin marking flange, fabricating a master box gage with a box marking flange, making up said box and pin gages to a selected degree with said pin marking and box marking flanges in overlaping relationship, forming registering radially extending marking holes in said marking flanges, making up said master pin gage to said selected degree with a working pin gage having a marking flange telescoping with said master pin gage marking flange, form a marking hole in said working pin gage marking flange in register with said master pin marking hole, making up said master box gage to said selected degree with a working box gage having a marking flange telescoping with said master box gage marking flange, forming a marking hole in said working box gage marking flange in register with said master box marking hole, making up said working pin gage with a pipe pin to said selected degree and marking said pipe pin with a marking stencil projecting through said working pin gage marking hole, and making up said working box gage to said selected degree with a pipe box and marking said box with a marking stencil projecting through said working box gage marking hole.

19. The method of claim 18 wherein said pipe pin and pipe box are made-up to bring said marks on the pin and box at least into register while monotoring the make-up torque.

20. The method of claim 18 wherein said pipe pin and pipe box are made up to a selected torque and said marks compared to make sure they are in an acceptable range.

21. The method of claim 18 wherein a second marking hole is formed in said working pin gage a selected number of degrees of make-up beyond hand tight make-up from said pin gage marking hole.

22. A thread gaging and marking system comprising:

a master pin gage and a master box gage patterned after the threads to be marked whereby, with the master gages made-up a selected amount, a common radial plane is established through the gages;

means for marking said common plane on the master box gage and on the master pin gage in close radial proximity with said gages made-up the select amount;

means for transferring said common plane marking to working box and pin gages from said master gages; and means including said working gages for marking product boxes and pins at a point along the common plane such that the marks on the products indicate them to be assembled to an amount equal to the same selected amount as established by the master gages or to said selected amount plus a selected number of degrees.

23. The gaging and marking system of claim 22 wherein the common plane on each gage is established by marking of each gage and transferring of the radial and longitudinal register point from master gages to working gages to work pieces.

* * * * *